United States Patent Office.

ALFRED STARR, OF NEW YORK, N. Y.

Letters Patent No. 78,023, dated May 19, 1868.

IMPROVED SOLDER FOR ALUMINUM.

*The Schedule referred to in these Letters Patent and making part of the same.*

TO ALL WHOM IT MAY CONCERN:

Be it known that I, ALFRED STARR, of the city and State of New York, have invented, made, and applied to use a certain new and useful Improvement in Solder for Aluminum; and I do hereby declare the following to be a correct description of the nature of the said improvement.

I have discovered that tin mixed with aluminum will form an alloy that melts at a lower temperature than aluminum, and that said alloy possesses the properties necessary for a solder, as it unites freely with aluminum when said solder is melted.

The tin being light, and of nearly the same color as aluminum, the alloy can scarcely be distinguished from the aluminum, hence articles soldered with such alloy are not injured in their appearance, and in plates for artificial teeth, and other articles exposed to acids or other discoloring-agents, my solder is almost as little affected as the aluminum itself.

I find that one-eighth, by weight, of tin to seven-eighths of aluminum will form an alloy that melts at a sufficiently less temperature than aluminum, to allow of its being used as a solder, but by increasing the proportion of tin the point of fusion will be lessened.

If desired, to make the solder harder, a portion of silver may be added, without injury to said solder.

What I claim, and desire to secure by Letters Patent, is—

The alloy specified, forming a solder for aluminum.

In witness whereof, I have hereunto set my signature, this 31st day of March, 1868.

ALFRED STARR.

Witnesses:
CHAS. H. SMITH,
GEO. D. WALKER.